Apr. 10, 1923.

D. F. LANE 1,451,513

WASHING MACHINE

Filed Apr. 10, 1922    3 sheets-sheet 1

Inventor
Daniel F. Lane

By Johnson & Johnson
Attorneys

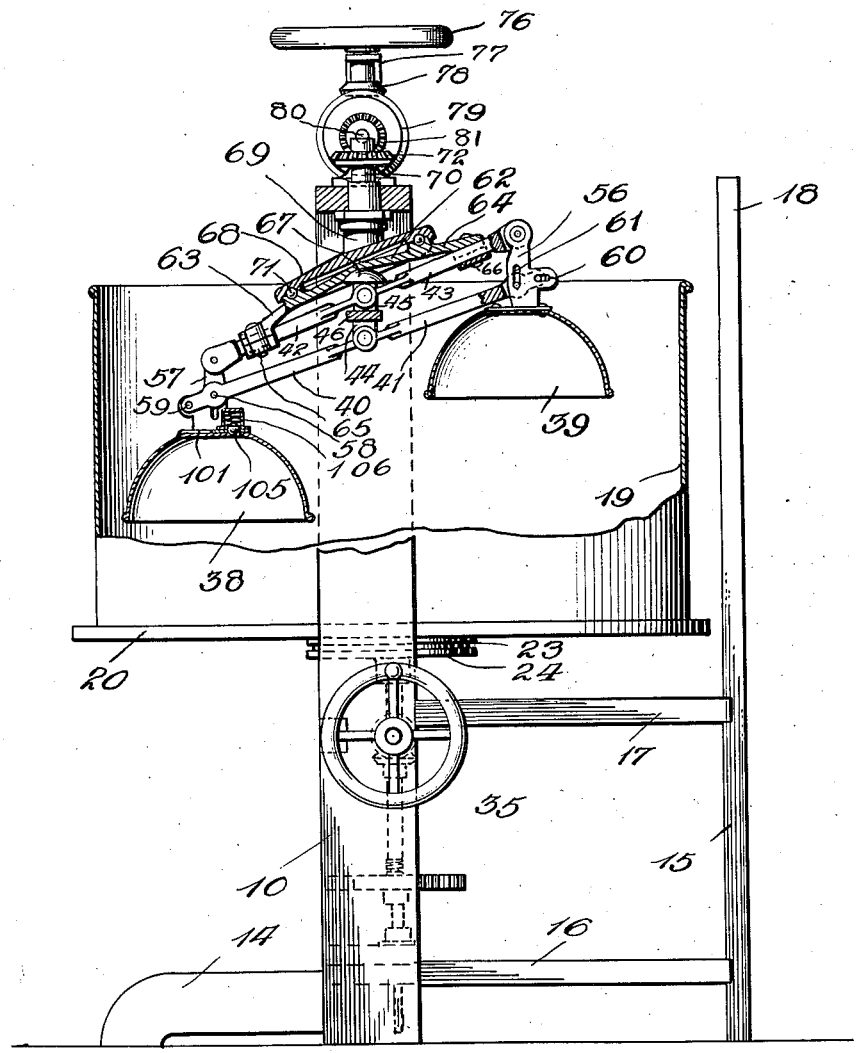

Apr. 10, 1923.
D. F. LANE
WASHING MACHINE
Filed Apr. 10, 1922
1,451,513
3 sheets-sheet 3
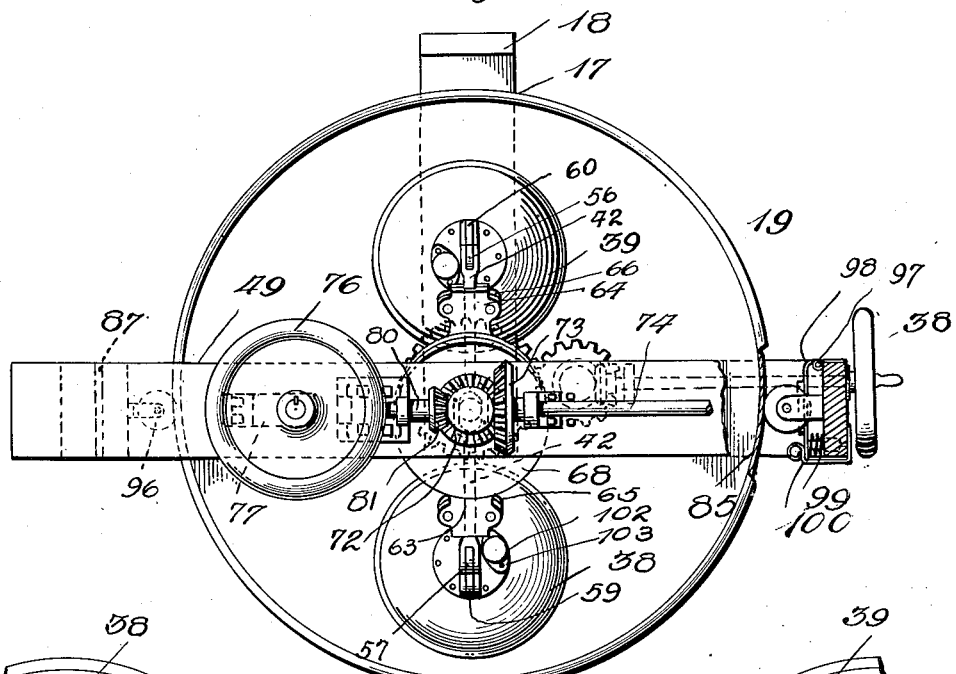
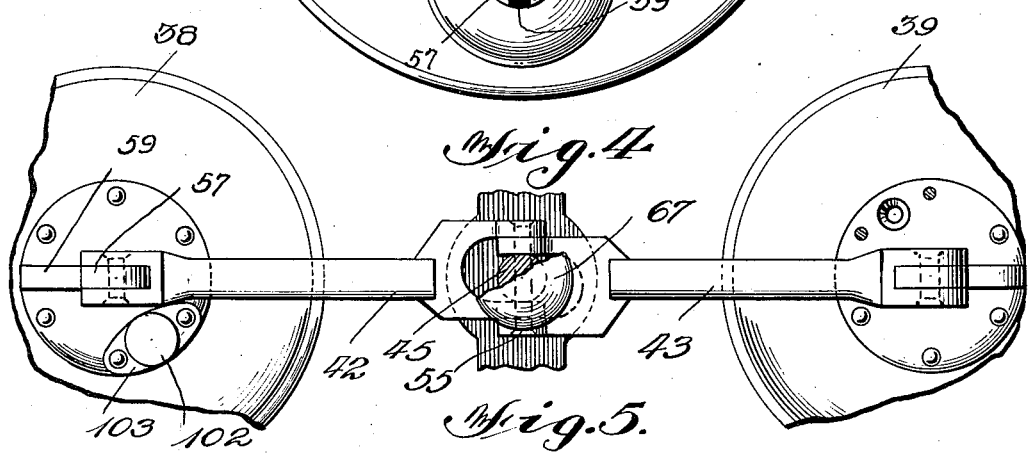
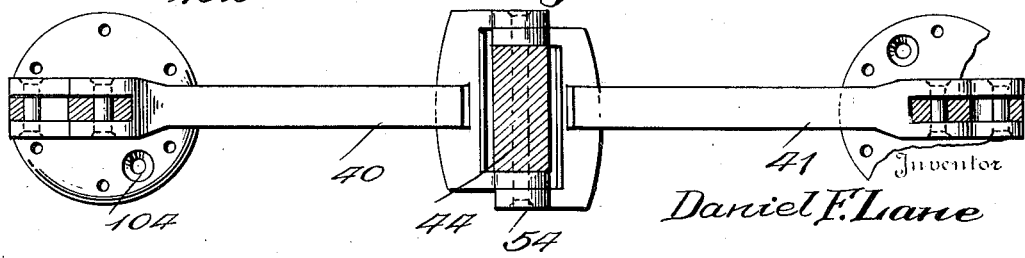
Inventor
Daniel F. Lane
By Johnson & Johnson
Attorneys Patented Apr. 10, 1923.

1,451,513

UNITED STATES PATENT OFFICE.

DANIEL F. LANE, OF PAINTED POST, NEW YORK.

WASHING MACHINE.

Application filed April 10, 1922. Serial No. 551,296.

*To all whom it may concern:*

Be it known that I, DANIEL F. LANE, a citizen of the United States, residing at Painted Post, in the county of Steuben and State of New York, have invented certain new and useful Improvements in Washing Machines, of which the following is a specification.

The invention relates to washing machines, and has as an object the provision of a machine of this nature which operates by means of suction cups, and which provides a structure of very simple nature for causing the action of such cups.

A further object of the invention is the provision of a machine having a vat adjustable for height to allow different quantities of material to be acted upon. Further objects of the invention will appear from the following description.

An illustrative embodiment of the invention is shown in the accompanying drawings, in which—

Fig. 2 is a side elevation, partly in central vertical section at right angles to Fig. 1.

Fig. 3 is a plan view.

Figs. 4 and 5 are detail views upon an enlarged scale, partly broken away, of the suction cup operating mechanism.

Figure 1:
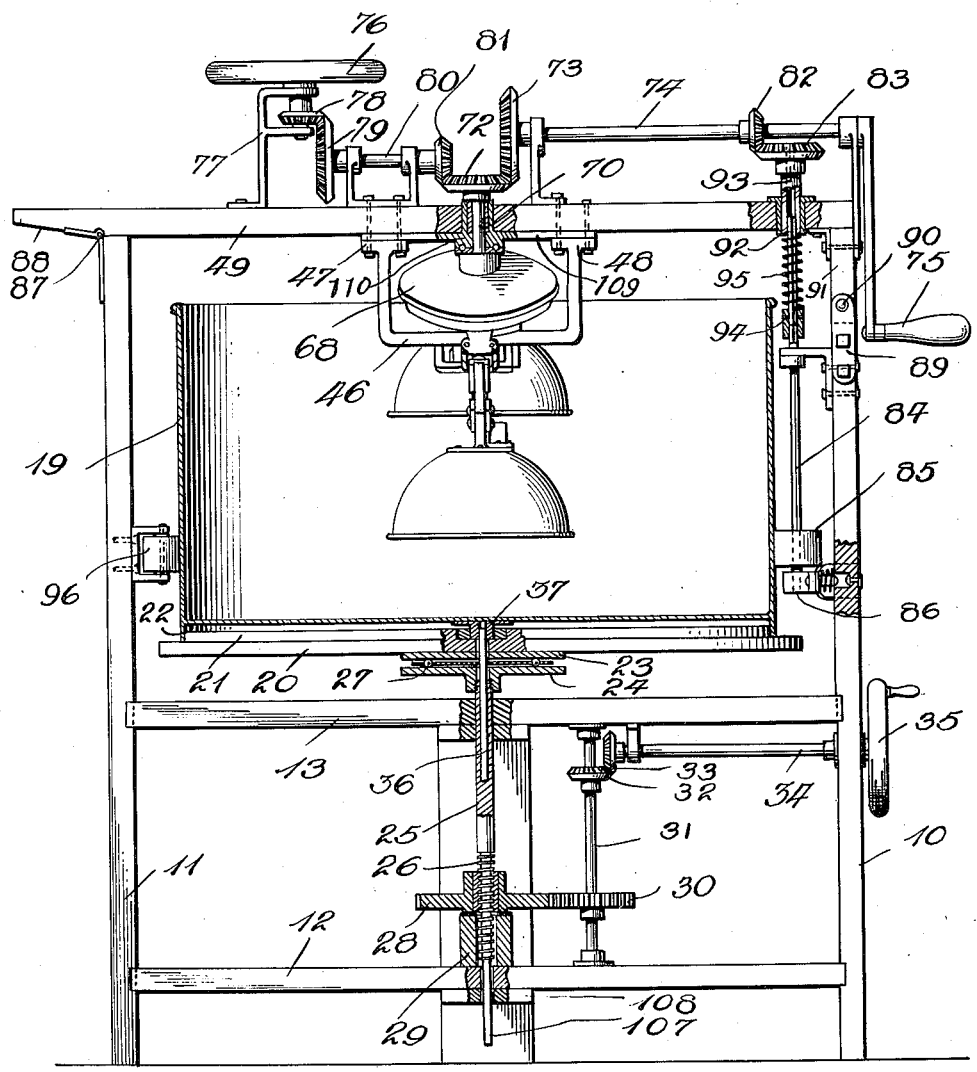
Fig. 1 is a side elevation, partly in central vertical section.

As shown in Fig. 1, the machine is mounted upon a frame work, comprising legs 10 and 11, and cross members 12 and 13. A foot 14, Fig. 2, may be provided to add stability to the machine. A third leg 15 is shown as attached to horizontal members 16, 17, and the upper end 18 may be utilized for attachment of a wringer.

To adjust the height of the vat 19 it is shown as mounted upon a supporting disk 20 having a smaller disk 21 mounted thereon adapted to be overlapped by the chine 22 of the vat. To make the vat revoluble the disk 20 is shown as mounted upon a metallic disk 23, which acts as a flat ball race, the opposite race 24 being supported upon a tubular member 25 having screw threads 26 near the lower portion. The lower part 107 is made square and passes through an iron plate 108 with a square hole to hold 25 from turning when being raised or lowered by turning pinion 28. Balls 27 are shown as retained in place by a suitable cage providing a thrust bearing upon which the vat may revolve. To adjust the height of the vat for use with different quantities of material to be washed, an internally threaded pinion 28 is seated upon a block 29, and is adapted to be revolved by a gear 30 fast upon the shaft 31, which shaft is shown as arranged for operation by means of bevel gears 32, 33, a shaft 34 and hand wheel 35. The bearing of the vat 19 is kept centered by means of a rod 36 passing into a bore in member 25 and projecting into a flanged collar 37 on the bottom of the vat.

The vat with its bearing 23, 24, is placed off center with relation to the suction cup apparatus to be described, to cause the cups to act over a greater percentage of the area of the vat rather than only over an annulus concentric with the vat. Preferably the center of the vat is displaced toward the leg 15 which position has the advantage of placing added weight on the leg 15 thereby increasing the stability of the device.

A pair of suction cups 38, 39 are shown as mounted for operation by means of a parallel motion system of levers comprising a pair of lower levers 40, 41, and a pair of upper levers 42, 43. The base 101 carrying the bracket 57 is shown in Fig. 2 as being provided with an air valve casing 102 secured thereon by means of rivets passing through the flange 103, which rivets are also utilized to secure the cup 38 to the base 101.

In Fig. 5 the base 101 is omitted to show a conical seat 104 for a ball valve 105, a spring 106 being provided to press the valve to its seat. As the cup is pressed downwardly the air may escape through the valve 105, and as the cup is again raised water will be drawn through the fabric as a result of the suction generated by a partial vacuum within the cup. Such an air valve may be furnished in both sides of both suction cups if desired.

The levers 40 to 43 inclusive are pivoted upon projecting lugs 44—45 carried by the horizontal member 46 of a yoke having its legs secured at 47, 48 upon a cross bar 49. The legs of the yoke are shown as planted upon the ends of a bar 109 which has, formed integrally with its center, a bearing 110 for the stub shaft 70 of the cup operating means.

As shown in Figs. 4 and 5, each pair of the links 40 to 43 inclusive are formed of two similar units with the arms 40 and 41 of one pair and the arms 42, 43 of the other pair off-set from the yoke at the end, through which yoke the pivot pins 54 and 55 pass.

By reason of the off-set the ears at the end of the yoke can be interleaved, as shown, placing the arms 40, 41, 42, 43, in alignment. The arms 42, 43 are pivoted to the upper end of brackets 56, 57 while the ends of arms 40, 41 have two pivotal points 58, 59, each working in a slot 60, 61 in the brackets 56, 57. Therefore an oscillation of the links 42, 43 will cause parallel motion of the cups 38, 39, maintaining them vertical at all times in their travel.

To cause the oscillation of the cups there is shown a disk 62 secured to the arms 42, 43 by means of projecting members 63, 64, and blocks 65, 66 bolted thereto surrounding the arms 42, 43. The upper extremity of lug 45 is shown as having a semi-spherical head 67 adapted to contact with the disk 62 in a depression in its bottom and to thereby guide the disk in its oscillation.

To operate the disk there is shown a second disk 68 having a boss 69 slightly offset from the center thereof and carrying a stub shaft 70, the axis of which projects at an angle to the plane of the disks 62, 68. A ball bearing 71 is provided in suitable races between the disks 62, 68. When the stub shaft 70 is revolved the angular relation of the disk 68 thereto will cause the plane of the disk 68 to revolve about the stub shaft, thereby causing an oscillation of the disk 62 and of the arms carrying the suction cups.

To revolve the stub shaft 70 the upper extremity thereof is shown as rigidly secured to a pivotal gear 72 in mesh with a second gear 73 secured to a shaft 74 having crank 75 attached to its end. If desired power operated means may be substituted for the crank 75. To cause a uniform motion of the suction cups a flywheel 76 is shown as mounted upon a bracket 77 having pivotal gears 78, 79 operated by a shaft 80 carrying a pivotal gear 81 in mesh with the gear 72.

To cause revolution of the vat 19 a pair of pivotal gears 82, 83 are provided to cause a revolution of a vertical shaft 84 carrying a friction wheel 85 preferably of such a material as rubber, the lower end of the shaft 84 being mounted in a bracket 86.

When the washed material is to be wrung out of the vat 19 it is desirable to have the suction cups and their operating means removed from over the vat. To provide for this the bar 49 is shown as hinged to the upright 11, as at 87, the projecting end of the bar 49 being beveled, as shown at 88, so that the bar with the attached mechanism, will swing beyond the vertical and will be retained by gravity in a position inclined away from the vat when opened. The connection with the bar 49 to the upright 10 is shown as taking the form of ears 89 bolted to the upright 10, and a removable pin 90 passing through a stub 91 secured to the cross member 49.

To provide a separable connection for the operating means of shaft 84 a squared shaft 92 is shown as sliding in a squared socket in the hollow shaft 93 to which gear 83 is secured, and as having a cap 94 with a squared interior adapted to fit upon the squared end of shaft 84. To separate the connection the shaft 92 may be pushed upwardly into its socket with compression of spring 95 until the cap 94 is free from the end of the shaft 84, when the bar 49 may be swung upwardly. Connection is made in the reverse manner when the suction cups are to be operated again. When engaging the parts the socket in cap 94 will come into register with the first quarter turn of the shaft 92 is not in register when the bar 49 is lowered, and by pressure of spring 95 will be snapped into engagement.

The vat 19 may be freely removed from the disks 20, 21, when the suction cups are swung upwardly. It is desirable to have the wheel 85 resiliently pressed against the side of the vat. To act as a resistance to this pressure an idle pulley 96 is shown mounted upon the uprights 11. To provide the yielding pressure of the wheel 85 the journal 86 is shown in Fig. 3 as being mounted upon a strap 97 pivoted upon the upright 10 at 98 and normally pressed toward the vat 19 by means of a spring 99. When the vat is to be removed the strap 97 may be pressed under a latch member 100 to prevent outward movement of the wheel 85, which would place it in the path of tub 19 when it is returned to position.

The operation of the device will be clear from the above description. Minor changes may be made in the physical embodiment of the invention without departing from its spirit.

What I claim is:

1. A washing machine comprising, in combination, a vat, a suction cup mounted for oscillation within said vat, an arm carrying said suction cup, a disk secured to said arm, a second disk revolubly engaging said first named disk, a stub shaft secured to said second disk and projecting therefrom at an angle other than a right angle to the plane of the disk, means to revolve said stub shaft.

2. A washing machine comprising, in combination, a frame, a vat revolubly mounted upon said frame, a cross bar hingedly secured to said frame, a suction cup mounted upon said cross bar, means mounted upon the bar to operate the said cup, means secured to the frame to revolve said vat, means mounted upon the bar to operate said last named means, and readily removable connection for said last named means for causing revolution.

3. A washing machine comprising, in combination, a vat, an arm pivoted above said vat, a suction cup carried by said arm, a disk rigidly secured to said arm, a disk revolubly mounted upon said first named disk, a stub shaft rigidly secured upon said second named disk eccentric thereto and projecting at other than a right angle from the plane thereof, means to revolve said stub shaft.

4. A washing machine comprising, in combination, a vat, a cross bar projecting across the mouth of said vat, a plurality of arms pivoted upon said cross member, suction cups mounted upon the ends of said arms for horizontal motion in oscillation, means to oscillate said suction cups comprising a disk rigidly secured to one of said arms, a second disk revolubly mounted upon said first named disk, a stub shaft eccentrically secured to said second named disk and projecting therefrom at an angle other than a right angle, means to revolve said stub shaft.

5. A washing machine comprising, in combination, a frame, a vertical shaft mounted in said frame having a screw threaded portion, means operating upon said screw threads to adjust said shaft vertically, a disk mounted upon said shaft in a horizontal plane, a disk revolubly mounted upon said first named disk, a vat carried by said second named disk, means to revolve said vat and means to agitate fabrics within said vat.

6. A washing machine comprising, in combination, a frame, a vat revolubly mounted in said frame, means to revolve said vat comprising a vertical shaft, a friction wheel upon said shaft, means to resiliently press said wheel against the wall of said vat, and means to restrain said resilient means when said vat is to be removed from the frame.

7. A washing machine comprising, in combination, a frame, a vat mounted in said frame, a cross bar extending above said vat, a suction cup mounted upon said cross bar for oscillation within the vat, means to actuate said suction cup comprising a vertical shaft, a bevel gear secured to said shaft, a driving gear meshing with said bevel gear, means to drive said last named gear, a second bevel gear meshing with said first named bevel gear, a shaft secured to said last named bevel gear and a flywheel driven by said last named shaft and mounted upon said cross bar.

DANIEL F. LANE.

Witnesses:
GLENN C. WILDER,
WILLIAM E. JIMERSON.